INVENTORS:
CHRISTIAAN H. SIEDERS
HENRI P. J. VERBEEK

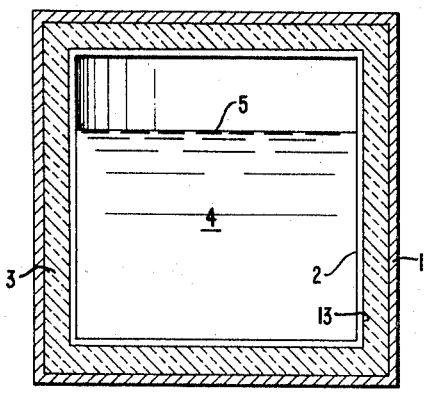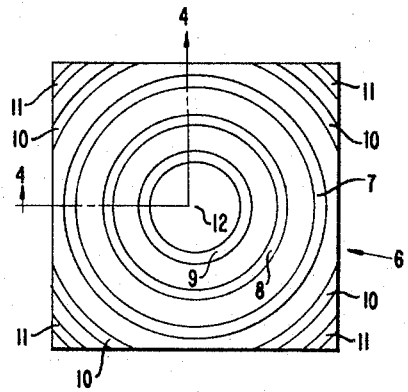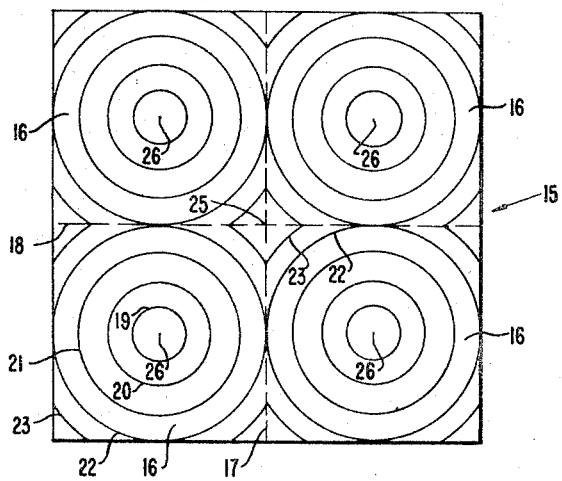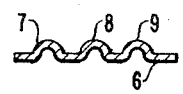
FIG. 1
FIG. 2
FIG. 3
FIG. 4

United States Patent Office 3,434,617
Patented Mar. 25, 1969

3,434,617
LIQUID STORAGE TANK
Christiaan H. Sieders and Henri P. J. Verbeek, The Hague, Netherlands, assignors to Shell Oil Company, New York, N.Y., a corporation of Delaware
Filed Nov. 4, 1966, Ser. No. 592,088
Claims priority, application Netherlands, Dec. 31, 1965, 6517251
Int. Cl. B65d 25/18
U.S. Cl. 220—9
1 Claim The invention relates to a tank for storing fluids, and more particularly to tanks having an inner container positioned in, and directly and/or indirectly supported by, a rigid outer container with at least one of the walls of the inner container being composed of one or more thin substantially square and/or rectangular plates provided with corrugations for absorbing expansion and contraction of the plates.

Tanks of this type, also called membrane tanks, are known and serve for storing fluids having a temperature which deviates from the ambient temperature. Since the temperatures of the fluids which have to be stored in these tanks deviate from the ambient temperature, the thin plates forming the inner container, which are each directly or indirectly secured to the outer container at not less than two points, must be capable of absorbing the expansions and contractions arising from the variations in temperature, without too high stresses or ruptures occurring. When the tank is empty, the thin plates constituting the inner container will, of course, have a temperature equal or substantially equal to the ambient temperature. When the tank is subsequently filled with a hot or cold fluid the thin plates constituting the inner container will expand or shrink respectively. If the hot or cold fluid is then removed from the tank the thin plates forming the inner container will shrink or expand respectively.

In recent years much attention has been paid to developing membrane tanks as described above, in particular for the storage and the transport of liquefied gases, for example, liquefied methane, natural gas, propane, ammonia or butane.

Much attention has been paid in particular to developing membrane tanks for the transportation by ship of liquid methane or natural gas at atmospheric or approximately atmospheric pressure and at a temperature of approximately —160° C. It will be understood that for the storage of fluids at the latter very low temperature the thin plates of the inner container must be capable of absorbing considerable contraction and expansion.

For transportation by ship it is desirable to use tanks of prismatic shape, since only the adoption of tanks of this shape allows the best possible use of the space available in the ship for the transport of cargo. However, if it is desired to use membrane tanks of prismatic shape the walls of the inner container will necessarily have to be rectangular or approximately rectangular. These rectangular walls of the inner container must therefore be capable of absorbing expansions and contractions owing to variations in temperature, without too high stresses or ruptures occurring in the material. It has already been suggested to absorb these expansions and contractions by providing the rectangular walls with corrugations. Since these expansions and contractions occur in two directions normal to each other, it has already been suggested to use corrugations crossing each other at right angles (see, for example, French patent of addition No. 75,049 of Conch International Methane Limited). A possible drawback of these known constructions with corrugations intersecting at right angles is that the point of intersection of these corrugations may give rise to rather complicated embodiments which are less simple to construct, so that high stresses in the material in and/or near the point of intersection sometimes occur upon contraction or expansion.

It has also been suggested to use corrugations normal to each other which do not intersect, namely by interrupting the corrugations in such a manner that they do not form points of intersection (see, for example, U.K. patent specifications 924,801, 924,802, 924,803, and 924,-804, all owned by Conch International Methane Limited). One objection that could be raised is that relatively high stresses in the material can occur during expansion and contraction near the interruptions of the corrugations.

It is an object of the invention to provide a construction of the above type which is simple and in which the corrugations in the thin plates of the inner container are arranged in such a way that high stresses in the material caused by expansion or contraction are avoided and that there is also the advantage that the corrugations can be arranged cheaply and simply in the thin plates.

To this end, the tank according to the invention is characterized in that the corrugations in the thin plate follow concentric lines closed on themselves and sections of concentric lines closed in themselves.

The corrugations in the thin plate may advantageously follow concentric circles and sections of concentric circles.

In an attractive embodiment the concentric circles and sections of concentric circles are described within a square and have a common center situated in the center of the square.

In a suitable embodiment at least one of the thin plates is square, the corrugations in this square plate following concentric circles and sections of concentric circles which have one common center situated in the center of the square plate.

If desired, the corrugations in the thin plate may follow concentric ellipses and sections of concentric ellipses.

The invention will now be further elucidated with reference to the drawings in which:

FIGURE 1 is a diagrammatical side view of a vertical cross section of a membrane tank;

FIGURE 2 is a diagrammatical top plan view of an embodiment of a side, top or bottom wall of the inner container according to FIGURE 1, comprising only one square plate provided with corrugations according to the invention;

FIGURE 3 is a diagrammatical top plan view of an embodiment of a side, top or bottom wall of the inner container according to FIGURE 1, comprising a number of interconnected square plates or a single plate in which squares are described, provided with the corrugations according to the invention;

FIGURE 4 is a side view of a cross section taken on line IV—IV of the square plate of FIGURE 2;

Figure 5:
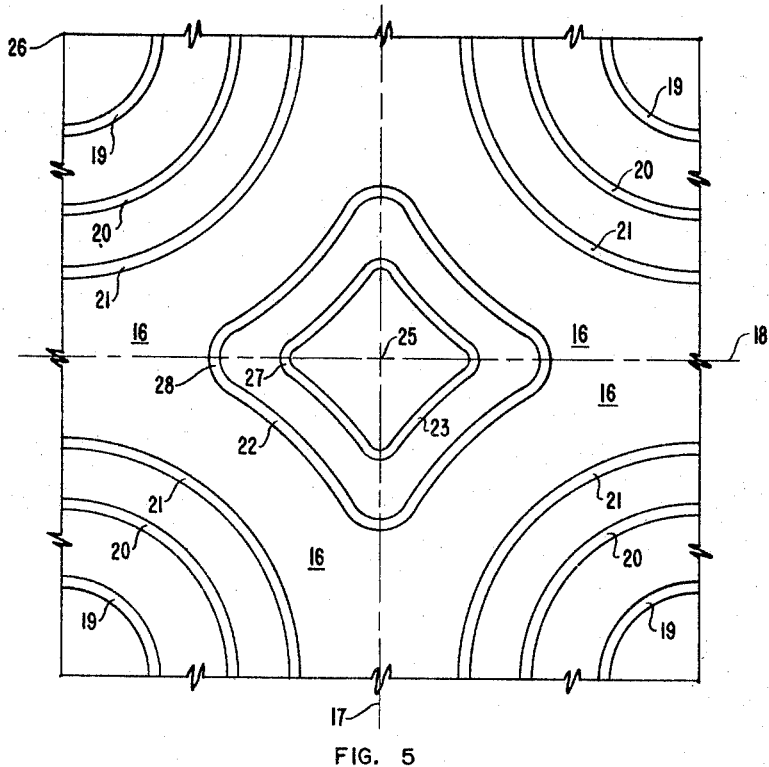
FIGURE 5 is a diagrammatical top plan view of a fragment of the embodiment according to FIGURE 3, on a scale larger than the one used in FIGURE 3.

The tank as shown in FIGURE 1 comprises a rigid outer container 1 lined on the inside with a layer of heat-insulating material 3. This heat-insulating material may consist of balsa wood, foamed polyurethane, or any other suitable heat-insulating material. This layer of heat-insulating material 3 may, if desired, be provided with a layer of liquid-tight and/or gas-tight material (not shown) at least on the inner surface.

The inner surface 13 of the layer of heat-insulating material 3 supports the inner container 2 consisting of thin plates which fit against the heat-insulating material 3. These thin plates may be made of metal, for example, stainless steel or aluminum. The thin plates may have a thickness of, for example, half a millimeter; it is also possible to use greater thicknesses, up to even approximately 8 mm.

For the sake of simplicity, FIGURE 1 does not show the corrugations present in the thin plates of the inner container 2. For the design and the position of the corrugations reference is made to the other figures. The inner container 2 is designed to contain the fluid which has to be stored in the tank; for example, liquefied natural gas, indicated by the numeral 4 and having a liquid level 5.

FIGURE 2 is a top plan view of an embodiment of a side, top or bottom wall 6 of the inner container 2. This side, top or bottom wall 6 consists of a single thin square plate provided with corrugations 7, 8, 9, 10 and 11. These corrugations 7, 8, 9, 10 and 11 run circularly in accordance with concentric circles having their common center in the center 12 of the square plate 6. The corrugations 7, 8 and 9 are shaped in such a way that they follow a closed circle. The corrugations 10 and 11 are considerably shorter and only cover a minor portion of a closed circle. The corrugations 10 and 11 and the outer corrugation 7 following a closed circle have such a length and/or diameter that they intersect the sides of the square plate 6. The plate 6 can be secured to an adjacent side, top or bottom wall of the inner container 2 in a liquid-tight and/or gas-tight manner, for example, by welding, soldering or gluing. As stated above, FIGURE 4 shows a side view of a cross section taken on line IV—IV of the square plate 6 of FIGURE 2, so that the shape of the corrugations 7, 8 and 9 is clearly apparent. It should be noted that in cross section the corrugations 10 and 11 have the same shape as the corrugations 7, 8 and 9. The cross-sectional shape of the corrugations, however, does not constitute an essential feature of the invention. If desired, other cross-sectional shapes can be used. The primary consideration is that the corrugations impart a certain amount of resilience to the plate.

FIGURE 3 is a top plan view of a side, top or bottom wall 15 of the inner container 2 of FIGURE 1, said wall 15 being composed of a large number of thin square plates 16 interconnected along the broken lines 17 and 18 forming the sides, for example, by means of welding, soldering or gluing. If desired, the wall 15 may, however, also consist of a single plate, in which a number of (imaginary) squares 16 is described, also indicated by the broken lines 17 and 18. Each square plate 16, or each square 16 is in principle identical with the square plate 6 of FIGURE 2 and is provided with corrugations 19, 20, 21 and 23, following concentric circles, which concentric circles have the center 26 of the plate 16 or the square 16 as common center. The corrugations 19, 20 and 21 follow completely closed circles, whereas the corrugations 22 and 23 are considerably shorter and only form a small section of a closed circle. The diameter and/or length of the corrugations 22 and 23 is such that the corrugations intersect the sides of the square plate 16 or of the square 16.

It is to be noted that in FIGURE 3 the corrugations are shown diagrammatically by circles or sections of circles, whereas in the FIGURES 2 and 4 the corrugations which run circularly or follow sections of circles are shown in their actual form.

Referring to FIGURE 5 which represents a fragment of the embodiment of FIGURE 3, the corrugations are shown in their actual form. The corrugations 22 and 23 connect up with the corrugations 22 and 23 of adjacent square plates 16 or squares 16, namely, at the point where they intersect the lines 17 and 18. In an advantageous embodiment as shown in FIGURE 5, these corrugations do not form a sharp angle at their junction but instead use is made of a rounding-off which, for example, follows a circular path. The roundings-off are designated by the numeral 27 for the corrugations 23 and by the numeral 28 for the corrugations 22.

Figure 6:
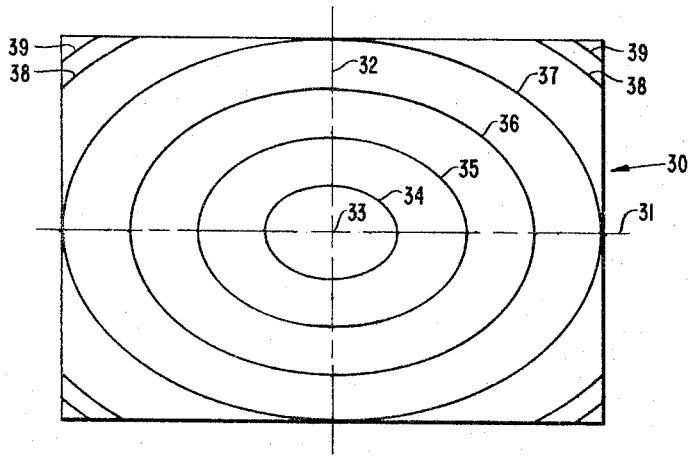
FIGURE 6 is a diagrammatical top plan view of another embodiment of a side, top or bottom wall of the inner container or a part thereof, comprising a rectangular plate or a rectangle provided with corrugations according to the invention.

The embodiment of FIGURE 6 differs from the embodiment of FIGURE 2 in that the corrugations are not described in a square but in a rectangle and in that the corrugations do not follow concentric circles but concentric ellipses or sections of concentric ellipses. The rectangular plate or the rectangle in which the ellipses are described is designated by the numeral 30. For the sake of simplicity the corrugations are shown diagrammatically by a few lines following concentric ellipses or sections of concentric ellipses. The transverse axis of all elipses is designated by the numeral 31 and the conjugate axis by the numeral 32. The point of intersection of the axes 31 and 32 coincides with the center of the rectangular plate or the rectangle 30 and is designated by the numeral 33. The transverse axis 31 runs parallel to the long side and the conjugate axis 32 runs parallel to the short side of the rectangular plate or rectangle 30. The corrugations following sections of an ellipse are designated by the numerals 38 and 39, respectively.

The embodiment shown in FIGURE 6 may, as one integral unit, form a complete side, top or bottom wall of the tank according to FIGURE 1. Alternatively, a side, top or bottom wall of the tank according to FIGURE 1 may be composed of a number of rectangular plates having the shape as shown in FIGURE 6, a number of the plates 30 being interconnected along the circumference, for example, by gluing, welding or soldering. Instead of interconnected plates 30, adjacent rectangles may be described on a large plate which is to form a side, top or bottom wall of the tank according to FIGURE 1, corrugations being arranged in each one of said rectangles to follow the ellipses or sections thereof, as shown in FIGURE 6. In other words, when rectangular plates with corrugations following concentric ellipses or sections of concentric ellipses are used, the tank may be constructed in a manner entirely analogous to the construction of the tank with the use of the square plates or squares described which are provided with corrugations following concentric circles or sections of concentric circles.

Instead of corrugations following normal ellipses (i.e., ellipses satisfying the equation $$\frac{x^2}{a^2} + \frac{y^2}{b^2} = 1$$

in which $a$ represents half the transverse axis and $b$ half the conjugate axis), it is also possible to use corrugations following so-called "superellipses." These superellipses satisfy the equation $$\frac{x^n}{a^n} + \frac{y^n}{b^n} = 1$$

in which $n > 2$, for example, $n = 2\frac{1}{2}$ (only generally defined for $x$ lying between 0 and $a$ and $y$ between 0 and $b$). As $n$ increases it approaches the shape of a rectangle. These superellipses or sections thereof are described concentrically within a rectangle or rectangular plate in the same manner as the normal ellipses. The centers of the superellipses or of sections of the superellipses are situated in the center of the rectangle or the rectangular plate. The center of the rectangle or the rectangular plate should be understood to be the point of intersection of the diagonals of the rectangle or the rectangular plates, as with the above normal ellipses. For further data on the said superellipses reference is made to the article by Martin Gardner, entitled "Mathematical Games," pp. 222–236 in the journal Scientific American, September 1965.

Instead of plates having corrugations which only follow circles, ellipses or superellipses, it is also possible to use plates in which the corrugations follow combinations of concentric circles, ellipses and/or superellipses. The corrugation having the most central position may follow a circle, for example, the next corrugation an ellipse and the subsequent corrugation a superellipse. The centers of the circle, the ellipse and the superellipse should coincide with the center of the rectangle or the rectangular plate.

The membrane tank according to the invention has the advantage that the thin plates of the inner container 2 are very simple and can consequently be readily produced at low cost, for example, by pressing metal plates of, for instance, stainless steel or aluminum, into the desired shape. The shape selected for the corrugations according to the invention allows for expansion and shrinking, due to variations in temperature, in all directions. The construction according to the invention has no complicated points of intersection of the corrugations at places where high stresses in material could develop.

The tank according to the invention is designed particularly for the storage and transportation of liquefied gases, such as liquefied methane or natural gas, at atmospheric pressure and very low temperature. In general it is, however, also possible to use the tank according to the invention for all kinds of liquid that have to be stored at temperatures which deviate from the ambient temperature.

The tank according to the invention may serve for storage, but also for transportation. When used for transportation, the tank may be built into a conveyance, for example, a ship. The ship may be of the double-hulled type. In the latter case the inner hull of the ship may serve as the outer container of the tank according to the invention.

The plates 6, 16 or 30 may each be secured to the heat-insulating layer 3 by providing each of them with a pin (not shown). These pins are secured normal to the surface of the squares, rectangles or plates 6, 16 or 30, namely, in the center, each pin fitting into a matching recess in the heat-insulating layer 3.

We claim as our invention:
1. A tank for holding fluids comprising:
   a rigid outer container;
   an inner container supported within said outer container and spaced therefrom;
   at least one of the walls of said inner container being comprised of a plurality of substantially rectangular plates secured together in bi-directionally coursed edge to edge relationship;
   each of said plates being formed with a plurality of curved corrugations concentric about and concave toward a central portion of the plate, said corrugations having a geometric pattern in the plane of the plate wherein at least some of said curved concentric corrugations are closed on themselves and at least the outermost one of said corrugations intersects the edge of said plate; and
   each of said corrugations which intersects the edge of the plate is reversely curved at a point adjacent its intersection with said plate edge so that said corrugation meets said edge normally and meets a corresponding corrugation of an adjacent plate so that it forms a smooth continuous curve with said corresponding corrugation.

References Cited
UNITED STATES PATENTS

| | | | |
|---|---|---|---|
| 1,957,639 | 5/1934 | Goodwin | 220—72 |
| 2,260,393 | 10/1941 | McCarthy | 220—63 |
| 2,876,927 | 3/1959 | Henning | 220—63 |
| 3,088,621 | 5/1963 | Brown | 220—9 |
| 3,224,621 | 12/1965 | Upthegrove | 220—9 |

JAMES R. GARRETT, *Primary Examiner.*

JOSEPH R. LECLAIR, *Assistant Examiner.*